(12) United States Patent
Yan et al.

(10) Patent No.: US 10,470,271 B2
(45) Date of Patent: Nov. 5, 2019

(54) LED DRIVING CIRCUIT WITH MEMORY FUNCTION FOR BRIGHTNESS ADJUSTMENT AND COLOR TUNING

(71) Applicant: Shanghai Huxing Technology Co., Ltd., Shanghai (CN)

(72) Inventors: Xiaofang Yan, Shanghai (CN); Zheng Zhu, Shanghai (CN); Wufeng Tang, Shanghai (CN)

(73) Assignee: Shanghai Huxing Technology Co., Ltd., Shanghai (CN)

( * ) Notice: Subject to any disclaimer, the term of this patent is extended or adjusted under 35 U.S.C. 154(b) by 0 days.

(21) Appl. No.: 16/031,184

(22) Filed: Jul. 10, 2018

(65) Prior Publication Data

US 2019/0029093 A1     Jan. 24, 2019

(30) Foreign Application Priority Data

Jul. 20, 2017   (CN) .................... 2017 2 0884757 U (51) Int. Cl.
*H05B 33/08* (2006.01)

(52) U.S. Cl.
CPC ..... *H05B 33/0863* (2013.01); *H05B 33/0815* (2013.01); *H05B 33/0827* (2013.01)

(58) Field of Classification Search
USPC ....................................................... 315/201
See application file for complete search history.

(56) References Cited

U.S. PATENT DOCUMENTS

| | | | | |
|---|---|---|---|---|
| 8,193,738 B2* | 6/2012 | Chu | .................. | H05B 33/0815 |
| | | | | 315/307 |
| 8,587,215 B2* | 11/2013 | Roberts | .............. | H05B 33/0896 |
| | | | | 315/291 |
| 9,060,401 B2* | 6/2015 | Shteynberg | .......... | H05B 33/083 |
| 9,078,327 B2* | 7/2015 | Livschitz | ........... | H05B 33/0848 |
| 9,408,269 B2* | 8/2016 | Zhu | ........... | H05B 37/02 |
| 9,426,856 B2* | 8/2016 | Shteynberg | .......... | H05B 33/083 |
| 9,474,122 B2* | 10/2016 | Kahlman | ........... | H05B 37/0209 |
| 9,510,414 B2* | 11/2016 | Kim | .................... | H05B 33/083 |
| 9,538,591 B2* | 1/2017 | Kim | .................... | H05B 33/0812 |
| 9,538,595 B2* | 1/2017 | Chang | ............... | H05B 33/0824 |
| 9,585,222 B2* | 2/2017 | Zhu | .................... | H05B 33/0887 |
| 9,750,107 B2* | 8/2017 | Zhu | .................... | H05B 33/0887 |
| 10,004,121 B2* | 6/2018 | Eum | ...................... | H02M 1/08 |

(Continued)

*Primary Examiner* — Dion Ferguson
*Assistant Examiner* — Srinivas Sathiraju
(74) *Attorney, Agent, or Firm* — Ware, Fressola, Maguire & Barber LLP (57) ABSTRACT

A lamp driving circuit has an AC/DC converter receives a dimmer voltage from a TRIAC dimmer with an on/off switch to turn on or off a lamp module having a number of LED lamp groups. The driving circuit also has an energy storage circuit and an MCU to control the switching of each of the lamp groups. The energy storage circuit provides a prolonged supply voltage to the MCU for a period of time after the dimmer is turned off so that the MCU can sense the off-time of the dimmer and count the number of consecutive times the dimmer is turned off and on during a preset time in order to control the color temperature of the lamp module. The MCU is programmed to store information regarding the color temperature the user has selected between a number of color temperatures such as 3000K, 4000K and 5000K.

18 Claims, 5 Drawing Sheets

(56) References Cited

U.S. PATENT DOCUMENTS

| | | | |
|---|---|---|---|
| 2009/0079357 A1* | 3/2009 | Shteynberg | H05B 33/0818 315/291 |
| 2011/0109249 A1* | 5/2011 | Liu | H05B 33/0809 315/307 |
| 2011/0204820 A1* | 8/2011 | Tikkanen | H05B 33/0815 315/294 |
| 2013/0249431 A1* | 9/2013 | Shteynberg | H05B 37/02 315/287 |
| 2013/0307431 A1* | 11/2013 | Zhu | H05B 33/0815 315/210 |
| 2014/0042933 A1* | 2/2014 | Livschitz | H05B 33/0848 315/307 |
| 2014/0125230 A1* | 5/2014 | Shteynberg | H05B 33/083 315/122 |
| 2014/0132172 A1* | 5/2014 | Zhu | H05B 37/02 315/210 |
| 2014/0139109 A1* | 5/2014 | Morales | H05B 33/0815 315/121 |
| 2014/0239833 A1* | 8/2014 | McCune, Jr. | H05B 33/0815 315/201 |
| 2014/0346973 A1* | 11/2014 | Zhu | H05B 37/02 315/307 |
| 2015/0257226 A1* | 9/2015 | Shteynberg | H05B 33/083 315/186 |
| 2016/0014861 A1* | 1/2016 | Zhu | H05B 33/0887 315/223 |
| 2016/0014865 A1* | 1/2016 | Zhu | H05B 33/0887 315/223 |
| 2016/0338163 A1* | 11/2016 | Zhu | H05B 37/02 |
| 2017/0311409 A1* | 10/2017 | Zhu | H05B 33/0887 |
| 2017/0359880 A1* | 12/2017 | Zhu | H05B 33/0887 |
| 2019/0029093 A1* | 1/2019 | Yan | H05B 33/0863 |

\* cited by examiner

LED DRIVING CIRCUIT WITH MEMORY FUNCTION FOR BRIGHTNESS ADJUSTMENT AND COLOR TUNING

CROSS REFERENCE TO RELATED PATENT APPLICATION

This application claims priority to Chinese patent application No. CN 201720884757.0, filed Jul. 20, 2017, the content of which is hereby incorporated by reference in its entirety.

TECHNICAL FIELD

The present invention is related to a driving circuit for brightness adjustment and color tuning of an LED lamp module.

BACKGROUND OF THE INVENTION

Currently the color temperatures of the LED lamps are controlled by proprietary control chips and the user is allowed to select among a few predetermined color temperatures. For example, if the predetermined color temperatures are 3000K, 4000K and 5000K and the user is able to choose the preferred temperature each time the LED lamps are turned on. However, the LED lamp driver does not have a memory function to remember the user's preferred color temperature.

SUMMARY OF THE DISCLOSURE

The present invention provides an LED driver circuit that can be used to adjust the brightness of the LED lamps. The LED driver circuit has an AC/DC converter receives a dimmer voltage from a TRIAC dimmer with an on/off switch to turn on or off a lamp module having a number of LED lamp groups. The driving circuit also has an energy storage circuit and a microcontroller unit (MCU) to control the switching of each of the lamp groups. The energy storage circuit provides a prolonged supply voltage to the MCU for a period of time after the dimmer is turned off so that the MCU can sense the off-time of the dimmer and count the number of consecutive times the dimmer is turned off and on during a preset time in order to control the color temperature of the lamp module. The MCU is programmed to store information regarding the color temperature the user has selected between a number of color temperatures such as 3000K, 4000K and 5000K. Thus, it is an aspect of the present invention to provide an electronic driving circuit for use with a lamp module, the lamp module comprising a plurality of lamp groups. The driving circuit comprises:

a voltage converter having an input to receive a dimmer voltage from a dimmer, the dimmer operable in a plurality of states, including an ON state or an OFF state;

an energy storage circuit;

a switching control unit configured to control switching of each of the plurality of lamp groups separately, wherein the voltage converter also comprises a first output arranged to provide a driving voltage to plurality of lamp groups simultaneously, a second output arranged to provide the switching control unit a state signal indicative of the states of the dimmer, and a third output configured to provide the energy storage unit a charging voltage when the dimmer is operated in the ON state, wherein the energy storage circuit is configured to provide a supply voltage to the switching control unit when the dimmer is operated in the ON state, and the energy storage unit is also configured to provide the supply voltage to the switching control unit for a time period after the state of the dimmer is changed from the ON state to the Off state.

According to an embodiment of the present invention, the dimmer is a TRIAC dimmer having a switch for changing the states of the dimmer between the ON state and the OFF state, wherein the dimmer comprises a dimming mechanism for adjusting brightness of the lamp module. The voltage converter comprises an AC/DC converter.

According to an embodiment of the present invention, each of the lamp groups is connected to a different electronic switch, and wherein the switching control unit comprises a microcontroller unit having a logic section and a driver section, the logic section arranged to receive the supply voltage and the state signal, and the driver section comprises a plurality of electronic drivers separately connected to the plurality of electronic switches arranged to turn on or off the lamp groups, the driver section also configured to receive electrical power from the energy storage unit for powering the electronic drivers.

According to an embodiment of the present invention, each of the lamp groups comprises one or more LED lamps, and said one or more LED lamps in at least two lamp groups are arranged to produce light at two color temperatures, including a first color temperature and a second color temperature, and wherein the lamp module is arranged to produce light of a module color temperature indicative of a combination of the first color temperature and the second color temperature when one or more lamp groups are turned on.

According to an embodiment of the present invention, the module color temperature of light produced by the lamp module is selectable based on a number of off/on events, each of the off/on events indicating the state of the dimmer being changed from the OFF state to the ON state.

According to an embodiment of the present invention, the logic section is configured to sense a time duration between two consecutive off/on events, the two consecutive off/on events including a first event and a second event, and wherein if the time duration exceeds a preset time, the module color temperature is maintained as the module color temperature assigned to the first event, and if the time duration is within the preset time, the module color temperature is changed to the module color temperature assigned to the second event.

According to an embodiment of the present invention, the logic section is configured to store information indicative of the module color temperature assigned to the first event when the time duration exceeds the preset time.

According to an embodiment of the present invention, the logic section is configured to sense a time duration between two consecutive off/on events, and wherein if the time duration exceeds a present time, the logic section is further configured to store the module color temperature such that when the state of the dimmer is changed from the OFF event to the ON state, the lamp module is arranged to produced light of the module color temperature stored in the logic section.

The second aspect of the present invention is a lighting system, comprising an electronic driving circuit as described above, and the lamp module for use with the electronic driving circuit.

The third aspect of the present invention is a lamp driving system, comprising:

an driving circuit as described above and a dimmer connected to the voltage converter for providing the dimmer voltage, the dimmer operable in a plurality of states, including an ON state or an OFF state.

DETAILED DESCRIPTION OF THE INVENTION

According to embodiments of the present invention, the LED driving circuit uses a commercially available dimmer having an on/off switch and a slide bar to adjust the brightness of the LED lamps. The LED lamps are provided in two or more lamp groups selected to produce light in different color temperatures. For examples, one lamp group produces light at 3000K, and one produces light at 5000K.

Figure 1:
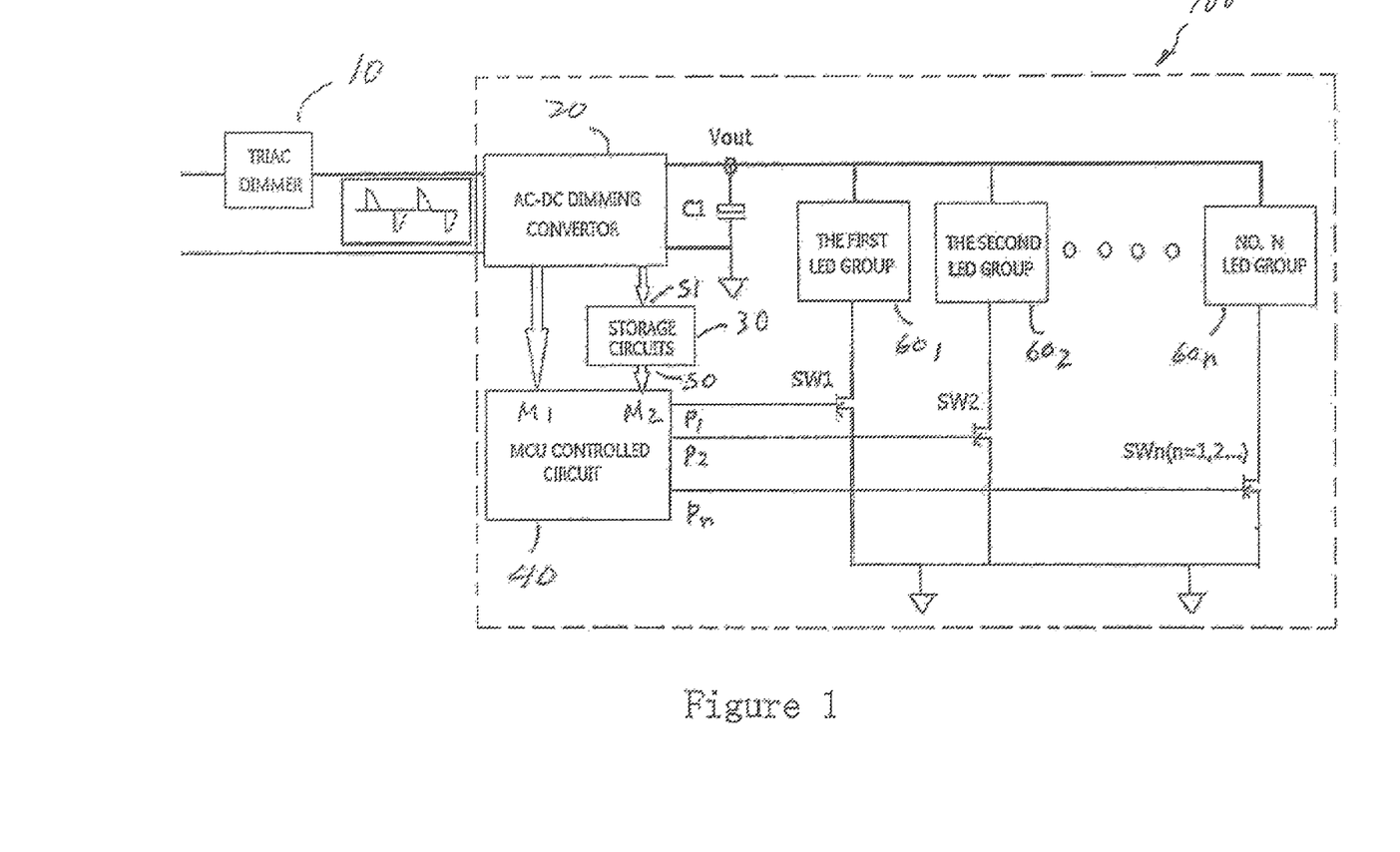
FIG. 1 illustrates an LED driving circuit, according to an embodiment of the present invention.
Figure 2:
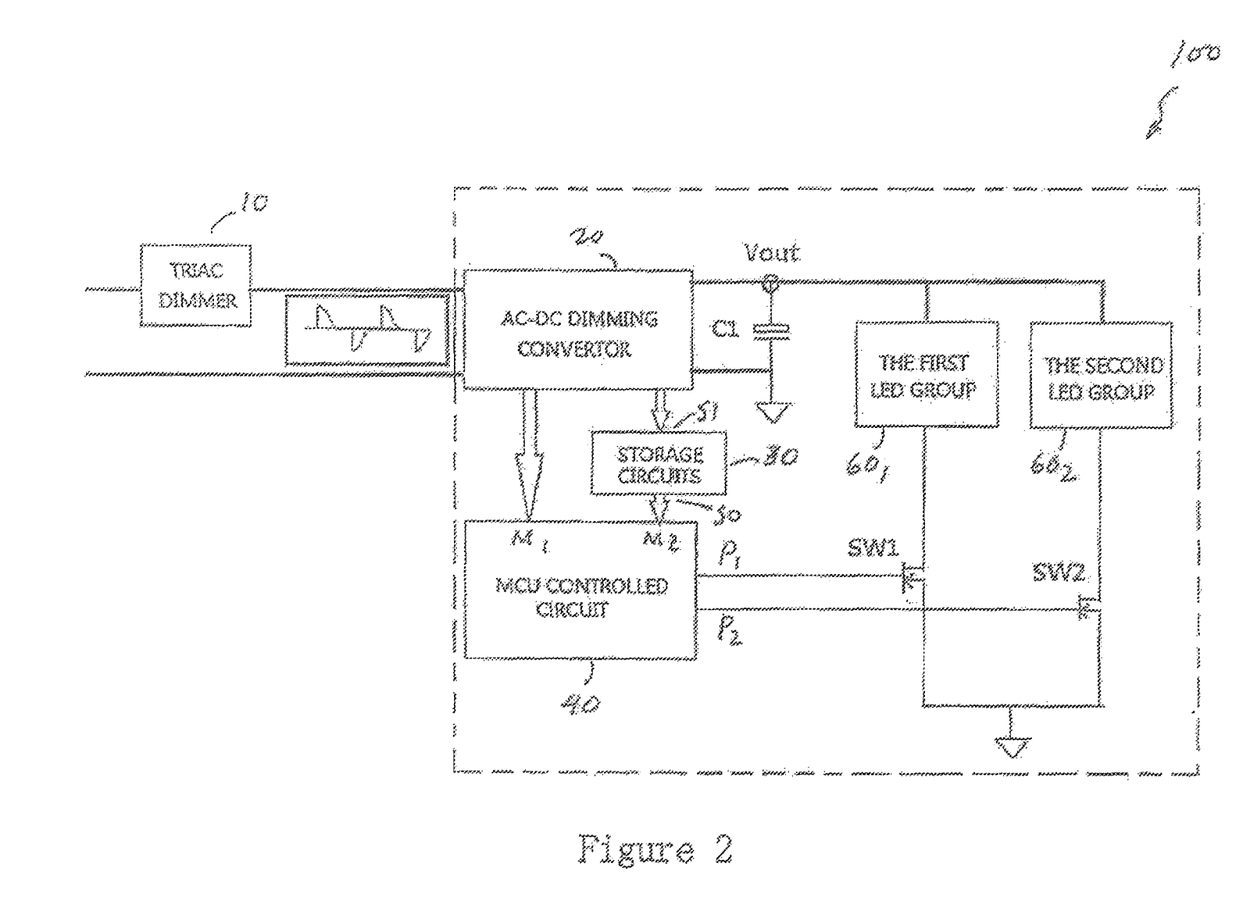
FIG. 2 illustrates an LED driving circuit, according to another embodiment of the present invention.

As seen in FIGS. 1 and 2, the LED driving circuit 100 comprises an AC/DC dimmer converter 20, an energy storage circuit 30, a microcontroller unit (MCU) 40 which controls the switching of two or more LED groups $60_1$, $60_2$, etc. The AC/DC dimmer converter 20 is arranged to receive input signals from a dimmer 10. The LED driving circuit 100 also includes an electrolytic capacitor C1 connected to the voltage output of the AC/DC dimmer converter 20. The positive terminal of the capacitor C1 is connected to the anode side of each of the LED groups $60_1$, $60_2$, etc. The cathode side of each of the LED groups $60_1$, $60_2$, etc. is connected to the negative terminal of the capacitor C1 through a different one of electronic switches $SW_1$, $SW_2$, etc. As seen in FIGS. 1 and 2, the AC/DC dimmer converter 20 provides electronic signals to an input M1 of the MCU 40 and an input $S_I$ of the energy storage circuit 30. An input M2 of the MCU 40 is arranged to receive a voltage signal from an output $S_O$ of the energy storage circuit 30. The MCU 40 provides signals at output $P_1$, $P_2$, etc. to separately turn SW1, SW2, etc. on or off. The voltage Vout of the capacitor C1 determines the brightness of the LED groups $60_1$, $60_2$, etc.

Figure 3:
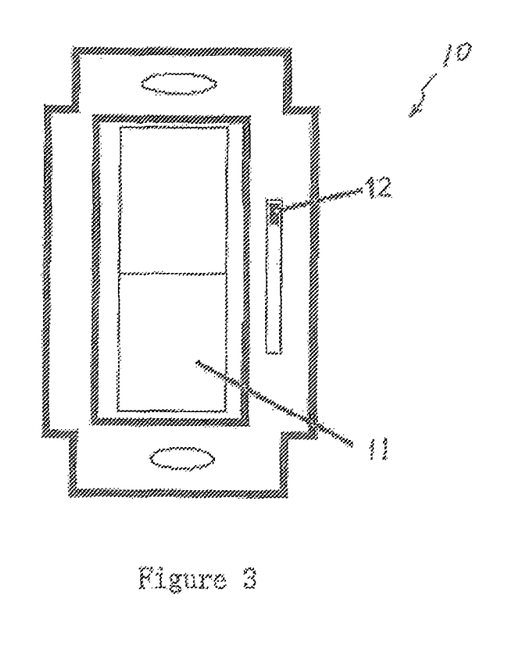
FIG. 3 illustrates a prior art dimmer.

FIG. 3 shows a typical dimmer that can be used as the dimmer 10 in FIGS. 1 and 2. The dimmer 10 has an on/off switch 11 and a slide bar 12 for dimming. The dimmer 10 can be a commercially available TRIAC dimmer which provides a truncated AC waveform for adjusting the brightness of the lamps.

Figure 4:
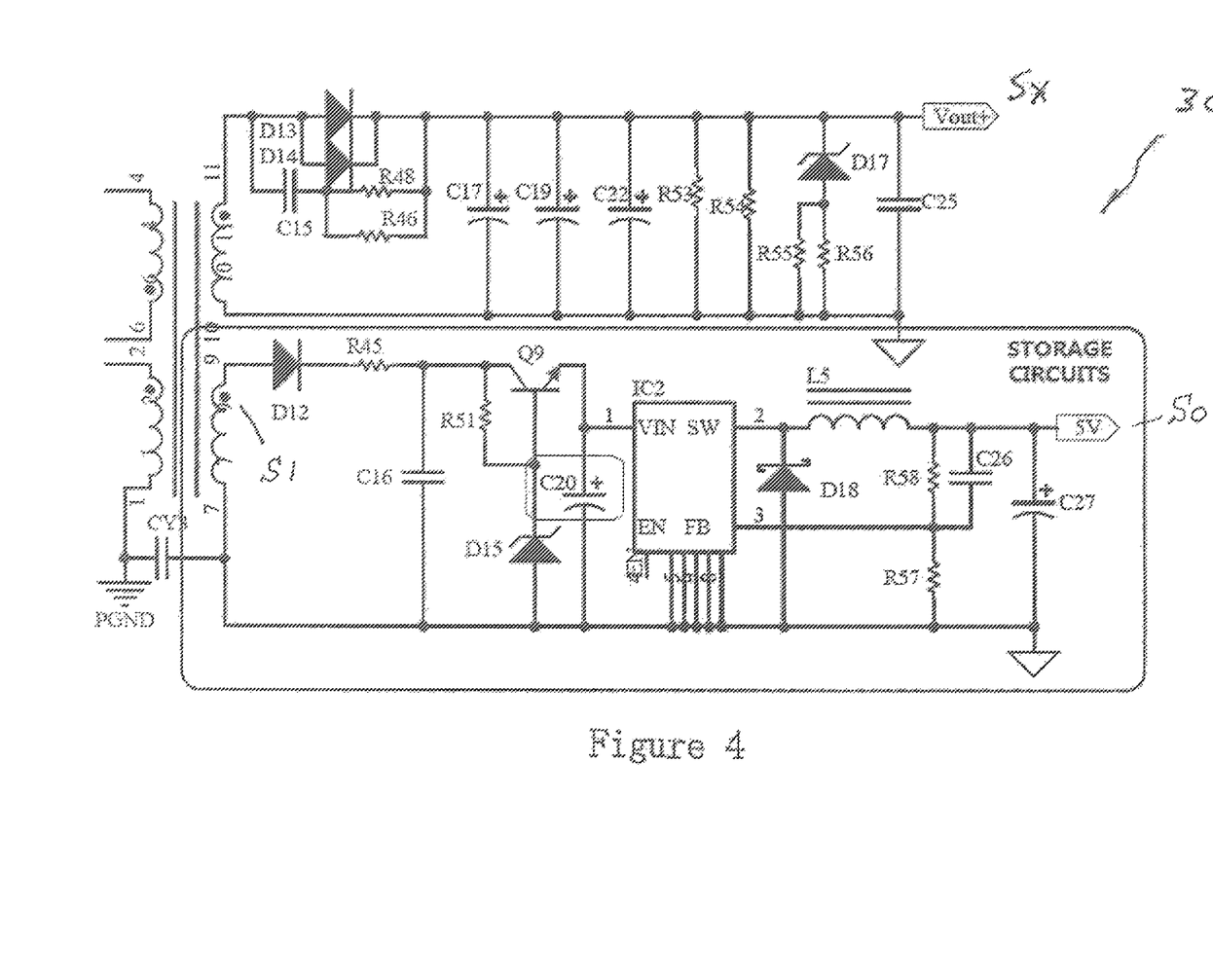
FIG. 4 shows an energy storage circuit for use in the LED driving circuit, according to an embodiment of the present invention.

FIG. 4 shows an energy storage circuit for use in the LED driving circuit, according to an embodiment of the present invention. As seen in FIG. 4, the output $S_O$ of the energy storage circuit 30 is connected to an electrolytic capacitor C27 to power the MCU 40 when the dimmer 10 is turned on and also for a preset time after the dimmer 10 is turned off. During the preset time, the MCU is arranged to sense the off-time of the dimmer 10 and to count the on/off times of the dimmer 10. The charging of the energy storage circuit 30 is carried out as follows: When the dimmer 10 is turned on, the input power at $S_I$ is arranged to charge the storage electrolytic capacitor C20 until the capacitor C20 is charged up to 58 V. When the dimmer 10 is turned off and the input power is cut off, the capacitor C20 is discharged through the step-down control chip IC2 to the electrolytic capacitor C27 in order to maintain an output voltage of 5V for a period of time. The stored energy in C20 is estimated to be able to power the MCU 40 for 8 seconds. The stored energy in C20 allows a user to change the color temperatures by turning the dimmer 10 off and then on within 5 seconds. If the off-time of the dimmer 10 exceeds 5 seconds, the MCU 40 is configured to store the setting for the last color temperature in a memory chip, such as an internal EEPROM or an external EEPROM.

The data stored in the EEPROM can be reserved for a long time after the input power is cut off. When the dimmer 10 is turned on again the next time after 5 seconds, the MCU 40 is configured to recall the reserved color temperature setting. Accordingly, the LED light groups are arranged to provide illumination at the last color temperature.

The energy storage circuit 30 also has an output $S_X$ to power the switching electronic components in the driver section of MCU 40.

Figure 5:
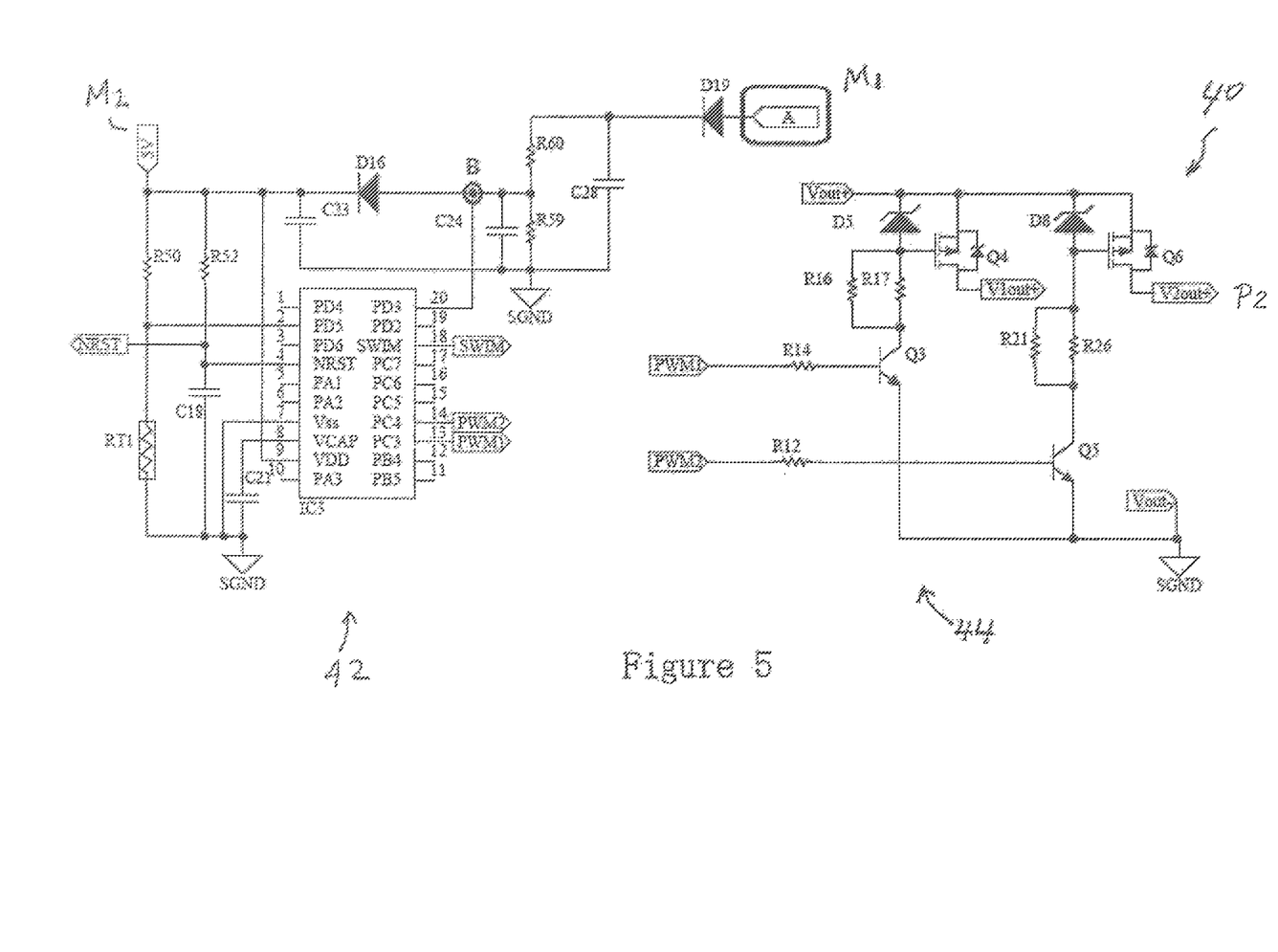
FIG. 5 shows a microcontroller unit for use in the LED driving circuit, according to an embodiment of the present invention.

FIG. 5 shows a microcontroller unit (MCU) for use in the LED driving circuit, according to an embodiment of the present invention. As seen in FIG. 5, the MCU 40 has a logic section 42 and a driver section 44. The logic section 42 has an input M2 which receives a voltage from the output $S_O$ of the energy storage unit 30. The control section 42 also has an input M1 connected to the AC/DC dimmer converter 10 for sensing the off-time of the dimmer 10 and counting the on-off times of the dimmer 10. The driver section 44 has an input M3 to receive a voltage from the output $S_X$ of the energy storage circuit 30 for separately providing switching signals at output P1, P2, etc. to the gate terminal of SW1. SW2 etc. According to an embodiment of the present invention, MCU 40 is a STM8S Series Single Chip of STMicroelectronics and has a built-in EEPROM to save data under the power-off condition. As shown in FIG. 5, the input signal A at input M1 passes through diode D19 and voltage divider R60/R59 to generate an input signal B at PD3 port of the MCU GPIO port. Based on the signal at PD3 port, the MCU determines whether there is an ON/OFF status change. When the dimmer 10 is turned off and the input power is cut off, PD3 is at a low signal level of 0. When the dimmer 10 is turned on, PD3 is at a high signal level of 1. The MCU is programmed to sense the signal level at PD3 in order to determine the OFF/ON status change for achieving the control logic as follows:

A) Dimmer switch turned off and then turned on the first time: the voltage of point A in FIG. 5 is changed from low to high, the output level of PD3 is changed from low level of 0 to high level of 1, PWM1 is set high, PWM2 is set low, Q3 and Q4 are on, Q5 and Q6 are off, V1out+ is at high output level, V2out+ is at low output level, and the color temperature is the first LED group color temperature, which is selected as 3000K;

B) Dimmer switch turned off and then turned on the second time: the voltage of point A in FIG. 5 is changed from low to high, the output level of PD3 is changed from low level of 0 to high level of 1, PWM1 is set high, PWM2 is set high, Q3 and Q4 are on, Q5 and Q6 are on, V1out+ is at high output level, V2out+ is also at high output level, and the color temperature is a mixture of the first LED group color temperature of 3000K and the second LED group color temperature of 5000K;

C) Dimmer switch turned off and then turned on the third time: the voltage of point A in FIG. 5 is changed from low to high, The output level of PD3 is changed from low level of 0 to high level of 1, PWM1 is set low, PWM2 is set high, Q3 and Q4 are off, Q5 and Q6 are on, V1out+ is at low output level, V2out+ is at high output level, and the color temperature is the second LED group color temperature of 5000K;

D) Dimmer switch turned off and then turned on the fourth time: the control logic repeats according to steps A, B, C above.

Accordingly, the LED driving circuit 100 is configured to have a memory function achieved by MCU 40, which is powered by the energy storage circuit 30. With the color temperature of a first LED group 60₁ being chosen at 3000K and the color temperature of a second LED group 60₂ being chosen at 5000K, the color temperature scheme of the present invention is achieved according to the following procedures:

A) When the on/off switch 11 of the dimmer 10 is initially off and is turned on the first time, the MCU is configured to turn on switch SW1 and turn off switch SW2. Accordingly, only the LED light group 60₁ is turned on to provide illumination at color temperature of 3000K.

B) If the on/off switch 11 of dimmer 10 is turned off and turned on the second time, the MCU is configured to turn on both switch SW1 and switch SW2. Accordingly, both the LED light groups 60₁ and 60₂ are turned on to provide illumination at color temperature of 4000K.

C) If the on/off switch 11 of dimmer 10 is turned off and turned on the third time, the MCU is configured to turn on switch SW2 and turn off switch SW1. Accordingly, the LED light group 60₁ is off and the LED light group 60₂ is turned on to provide illumination at color temperature of 5000K.

D) If the on/off switch 11 of dimmer 10 is turned off and turned on the fourth time, the control logic repeats as procedures A, B, C above.

The procedures A to D as described above are designed to change the color temperatures of light provided by the LED light groups 60₁ and 60₂. According to an embodiment of the present invention. In order to change the color temperatures of the illumination, the off time between two consecutive turn-on actions on the dimmer on/off switch 11 must be within a preset time, such as 5 seconds. For example, if the user wants to change the color temperatures from 3000K to 4000K, procedure (B) must be carried out after procedure (A) within 5 seconds. If the off-time between procedure (B) and procedure (A) exceeds 5 seconds as sensed by the MCU, the color temperature according to procedure (A), or 3000K, is maintained. Likewise, if the user wants to change the color temperature from 4000K to 5000K, procedure (C) must be carried out after procedure (B) within 5 seconds. If the user prefers the color temperature of 5000K, the user must execute procedures (A) to (C) in succession within a short time. If the user prefers a certain color temperature, the user must wait at least 5 seconds before turning off the dimmer so as to allow the MCU to store the switch setting of the current color temperature. For example, after carrying out procedures (A) and (B) within 5 seconds to achieve the color temperature of 4000K, the user must wait at least 5 seconds before turning off the dimmer so as to allow the MCU to store the switch setting of the 4000K color temperature. When the user turns on the dimmer the next time, the color temperature of the lamp module will be 4000K as SW1 and SW2 are turned on or off by the driver section of the MCU according to the stored switch setting. To change the color temperatures, the user must turn the dimmer on and off one or two times according to the procedures as described above.

At any time, the user can adjust the brightness of the light at the provided color temperature by controlling the slide bar 12 of dimmer 10.

In summary, the present invention provides an electronic driving circuit for use with a lamp module, the lamp module comprising a plurality of lamp groups. The driving circuit comprises a voltage converter having an input to receive a dimmer voltage from a dimmer, the dimmer operable in a plurality of states, including an ON state or an OFF state; an energy storage circuit; a switching control unit configured to control switching of each of the plurality of lamp groups separately, wherein the voltage converter also comprises a first output arranged to provide a driving voltage to plurality of lamp groups simultaneously, a second output arranged to provide the switching control unit a state signal indicative of the states of the dimmer, and a third output configured to provide the energy storage unit a charging voltage when the dimmer is operated in the ON state, wherein the energy storage circuit is configured to provide a supply voltage to the switching control unit when the dimmer is operated in the ON state, and the energy storage unit is also configured to provide the supply voltage to the switching control unit for a time period after the state of the dimmer is changed from the ON state to the Off state. The dimmer can be a TRIAC dimmer having a switch for changing the states of the dimmer between the ON state and the OFF state, wherein the dimmer comprises a dimming mechanism for adjusting brightness of the lamp module. According to an embodiment of the present invention, each of the lamp groups is connected to a different electronic switch, and wherein the switching control unit comprises a microcontroller unit having a logic section and a driver section, the logic section arranged to receive the supply voltage and the state signal, and the driver section comprises a plurality of electronic drivers separately connected to the plurality of electronic switches arranged to turn on or off the lamp groups, the driver section also configured to receive electrical power from the energy storage unit for powering the electronic drivers. Each of the lamp groups comprises one or more LED lamps, and said one or more LED lamps in at least two lamp groups are arranged to produce light at two color temperatures, including a first color temperature and a second color temperature, and wherein the lamp module is arranged to produce light of a module color temperature indicative of a combination of the first color temperature and the second color temperature when one or more lamp groups are turned on. According to an embodiment of the present invention the module color temperature of light produced by the lamp module is selectable based on a number of off/on events, each of the off/on events indicating the state of the dimmer being changed from the OFF state to the ON state. The logic section is configured to sense a time duration between two consecutive off/on events, the two consecutive off/on events including a first event and a second event, and wherein if the time duration exceeds a preset time, the module color temperature is maintained as the module color temperature assigned to the first event, and if the time duration is within the preset time, the module color temperature is changed to the module color temperature assigned to the second event.

The logic section is further configured to store information indicative of the module color temperature assigned to the first event when the time duration exceeds the preset time.

The control logic according to an embodiment of the present invention can be understood from the following examples:

Example 1, the first event is when the first time the dimmer is turned on in procedure A, PWM1 is on and PWM2 is off. The module (overall) color temperature is the temperature of the first LED group of 3000K. The second event is when the dimmer is turned on the second time in procedure B.

If the time between the first event and the second event exceeds 5 seconds, the overall color temperature is kept at 3000K;

If the time between the first event and the second event is within 5 seconds, both PWM1 and PWM2 are on, and overall color temperature is changed to 4000K.

Example 2, the first event is when the dimmer is turned on the second time in procedure B and both PWM1 and PWM2 are on. The module (overall) color temperature is 4000K. The second event is when the dimmer is turned on the third time in procedure C.

If the time between the first event and the second event exceeds 5 seconds, the overall color temperature is kept at 4000K;

If the time between the first event and the second event is within 5 seconds, PWM1 is off and PWM2 is on, and overall color temperature is changed to 5000K.

Example 3, the first event is when the dimmer is turned on the third time in procedure C, PWM1 is off and PWM2 is on. The module (overall) color temperature is the temperature of the first LED group of 5000K. The second event is when the dimmer is turned on the fourth time in procedure D.

If the time between the first event and the second event exceeds 5 seconds, the overall color temperature is kept at 5000K.

If the time between the first event and the second event is within 5 seconds, PWM1 is on and PWM2 is off, and overall color temperature is changed to 3000K.

Example 4: if the overall color temperature is 4000K before the last time the dimmer is turned off, the overall color temperature will be 4000K when the dimmer is turned on again after a long wait—see Example 2 above.

It is understood by a person of ordinary skill in the art that the color temperature selections as described above are based on the states of two switches SW1 and SW2 in the driver section of the MCU, and the three achievable color temperatures are the results from the color temperatures of two LED groups. When more than two switches in the driver section of the MCU are used to turn on or off more than two LED groups in the LED module, more than three different color temperatures can be achieved.

Furthermore, the preset time of 5 seconds is selected according to an embodiment of the present invention, a shorter or longer preset time can be achieved by changing the time constant in the energy storage circuit.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. An electronic driving circuit for use with a lamp module, the lamp module comprising a plurality of lamp groups, said driving circuit comprising:
   a voltage converter having an input to receive a dimmer voltage from a dimmer, the dimmer operable in a plurality of states, including an ON state or an OFF state;
   an energy storage circuit comprising a circuit input and a circuit output;
   a switching control unit comprising a first unit input, a second unit input, and a plurality of unit outputs, the plurality of unit outputs configured to control switching of each of the plurality of lamp groups separately, wherein the voltage converter also comprises a first output, a second output and a third output, the first output arranged to provide a driving voltage to the plurality of lamp groups simultaneously, the second output connected to the first unit input to provide the switching control unit a state signal indicative of the states of the dimmer, the third output connected to the circuit input to provide the energy storage unit a charging voltage when the dimmer is operated in the ON state, and wherein the circuit output of the energy storage circuit is electrically connected to the second unit input to provide a supply voltage to the switching control unit when the dimmer is operated in the ON state, and the energy storage unit is also configured to provide the supply voltage to the switching control unit for a time period after the state of the dimmer is changed from the ON state to the Off state.

2. The electronic driving circuit according to claim 1, wherein the dimmer is a TRIAC dimmer having a dimmer switch for changing the states of the dimmer between the ON state and the OFF state, wherein the dimmer further comprises a dimming mechanism for adjusting brightness of the lamp module.

3. The electronic driving circuit according to claim 2, wherein the voltage converter comprises an AC/DC converter.

4. The electronic driving circuit according to claim 1, wherein each of the lamp groups is connected to a different electronic switch, and wherein the switching control unit comprises a microcontroller unit having a logic section and a driver section, the logic section arranged to receive the supply voltage and the state signal, and the driver section comprises a plurality of electronic drivers separately connected to the plurality of electronic switches arranged to turn on or off the lamp groups, the driver section also configured to receive electrical power from the energy storage unit for powering the electronic drivers.

5. The electrical driving circuit according to claim 4, wherein each of the lamp groups comprises one or more LED lamps, and said one or more LED lamps in at least two lamp groups are arranged to produce light at two color temperatures, including a first color temperature and a second color temperature, and wherein the lamp module is arranged to produce light of a module color temperature indicative of a combination of the first color temperature and the second color temperature when one or more lamp groups are turned on.

6. The electrical driving circuit according to claim 5, wherein the module color temperature of light produced by the lamp module is selectable based on a number of off/on events, each of the off/on events indicating the state of the dimmer being changed from the OFF state to the ON state.

7. The electrical driving circuit according to claim 6, wherein the logic section is configured to sense a time duration between two consecutive off/on events, the two consecutive off/on events including a first event and a second event, and wherein
   if the time duration exceeds a preset time, the module color temperature is maintained as the module color temperature assigned to the first event, and
   if the time duration is within the preset time, the module color temperature is changed to the module color temperature assigned to the second event.

8. The electrical driving circuit according to claim 7, wherein the logic section is configured to store information indicative of the module color temperature assigned to the first event when the time duration exceeds the preset time.

9. The electrical driving circuit according to claim 6, wherein the logic section is configured to sense a time duration between two consecutive off/on events, and wherein if the time duration exceeds a present time, the logic section is further configured to store the module color temperature such that when the state of the dimmer is changed from the OFF event to the ON state, the lamp module is arranged to produced light of the module color temperature stored in the logic section.

10. A lighting system, comprising an electronic driving circuit according to claim 1, and the lamp module for use with the electronic driving circuit.

11. The lamp system according to claim 10, wherein the dimmer is a TRIAC dimmer having a switch for changing the states of the dimmer between the ON state and the OFF state, wherein the dimmer comprises a dimming mechanism for adjusting brightness of the lamp module and the voltage converter comprises an AC/DC converter.

12. The lighting system according to claim 11, wherein each of the lamp groups is connected to a different electronic switch, and wherein the switching control unit comprises a microcontroller unit having a logic section and a driver section, the logic section arranged to receive the supply voltage and the state signal, and the driver section comprises a plurality of electronic drivers separately connected to the plurality of electronic switches arranged to turn on or off the lamp groups, the driver section also configured to receive electrical power from the energy storage unit for powering the electronic drivers.

13. The lighting system according to claim 12, wherein each of the lamp groups comprises one or more LED lamps, and said one or more LED lamps in at least two lamp groups are arranged to produce light at two color temperatures, including a first color temperature and a second color temperature, and wherein the lamp module is arranged to produce light of a module color temperature indicative of a combination of the first color temperature and the second color temperature when one or more lamp groups are turned on.

14. The lighting system according to claim 13, wherein the module color temperature of light produced by the lamp module is selectable based on a number of off/on events, each of the off/on events indicating the state of the dimmer being changed from the OFF state to the ON state, and wherein the logic section is configured to sense a time duration between two consecutive off/on events, the two consecutive off/on events including a first event and a second event, and wherein
 if the time duration exceeds a preset time, the module color temperature is maintained as the module color temperature assigned to the first event, and
 if the time duration is within the preset time, the module color temperature is changed to the module color temperature assigned to the second event, and wherein the logic section is configured to store information indicative of the module color temperature assigned to the first event when the time duration exceeds the preset time.

15. The lighting system according to claim 12, wherein the module color temperature of light produced by the lamp module is selectable based on a number of off/on events, each of the off/on events indicating the state of the dimmer being changed from the OFF state to the ON state, and wherein the logic section is configured to sense a time duration between two consecutive off/on events, the two consecutive off/on events including a first event and a second event, and wherein if the time duration exceeds a preset time, the logic section is further configured to store the module color temperature such that when the state of the dimmer is changed from the OFF event to the ON state, the lamp module is arranged to produced light of the module color temperature stored in the logic section.

16. A lamp driving system, comprising:
 a driving circuit according to claim 1; and
 a dimmer connected to the voltage converter for providing the dimmer voltage, the dimmer operable in a plurality of states, including an ON state or an OFF state.

17. The electronic driving circuit according to claim 1, further comprising a plurality of electronic switches, each electronic switch connected to a different one of unit outputs of the switching control unit, wherein each of the lamp groups comprises one or more LED lamps and each of the lamp groups has an anode side and a cathode side, and wherein the anode side of each of the lamp groups is connected to the anode side of another of lamp groups, and the cathode side of each of the lamp groups is connected to a different one of said plurality of electronic switches.

18. The electronic driving circuit according to claim 17, comprising a plurality of current paths, each of the current paths comprising a different one of the lamp groups and the electronic switch connected thereto, and wherein all the current paths are connected in parallel.

\* \* \* \* \*